United States Patent [19]

McLaughlin et al.

[11] 3,941,989
[45] Mar. 2, 1976

[54] REDUCING POWER CONSUMPTION IN CALCULATORS

[75] Inventors: Donald L. McLaughlin, Newtown Square; Ronald W. Streiber, Norristown, both of Pa.

[73] Assignee: MOS Technology, Inc., Norristown, Pa.

[22] Filed: Dec. 13, 1974

[21] Appl. No.: 532,596

[52] U.S. Cl............ 235/156; 340/172.5; 340/324 R
[51] Int. Cl.² ...................... G06F 7/38; G06F 1/04
[58] Field of Search ...... 235/156; 340/324 R; 445/1

[56] References Cited
UNITED STATES PATENTS

| | | | |
|---|---|---|---|
| 3,453,601 | 7/1969 | Bogert et al. | 340/172.5 |
| 3,781,852 | 12/1973 | White et al. | 340/324 R |
| 3,812,489 | 5/1974 | Hirano et al. | 340/324 R |

Primary Examiner—R. Stephen Dildine, Jr.
Attorney, Agent, or Firm—Cooper, Dunham, Clark, Griffin & Moran

[57] ABSTRACT

Continuous power and a high rate clock are supplied to a calculator while it is in an execute mode and is actually decoding and processing input information, but lower duty cycle power and lower duty cycle clock pulses are supplied during the subsequent display mode, when the only requirement is to maintain and display selected information resulting from the execute cycle, so as to reduce the power consumption rate as compared to the rate during the execute mode. If there is no new execute mode within a selected time interval, the display is turned off and the duty cycle of the power and the clock supplied to the calculator are lowered still further so as to maintain (without displaying) selected stored information but to further reduce the rate of power consumption.

15 Claims, 3 Drawing Figures

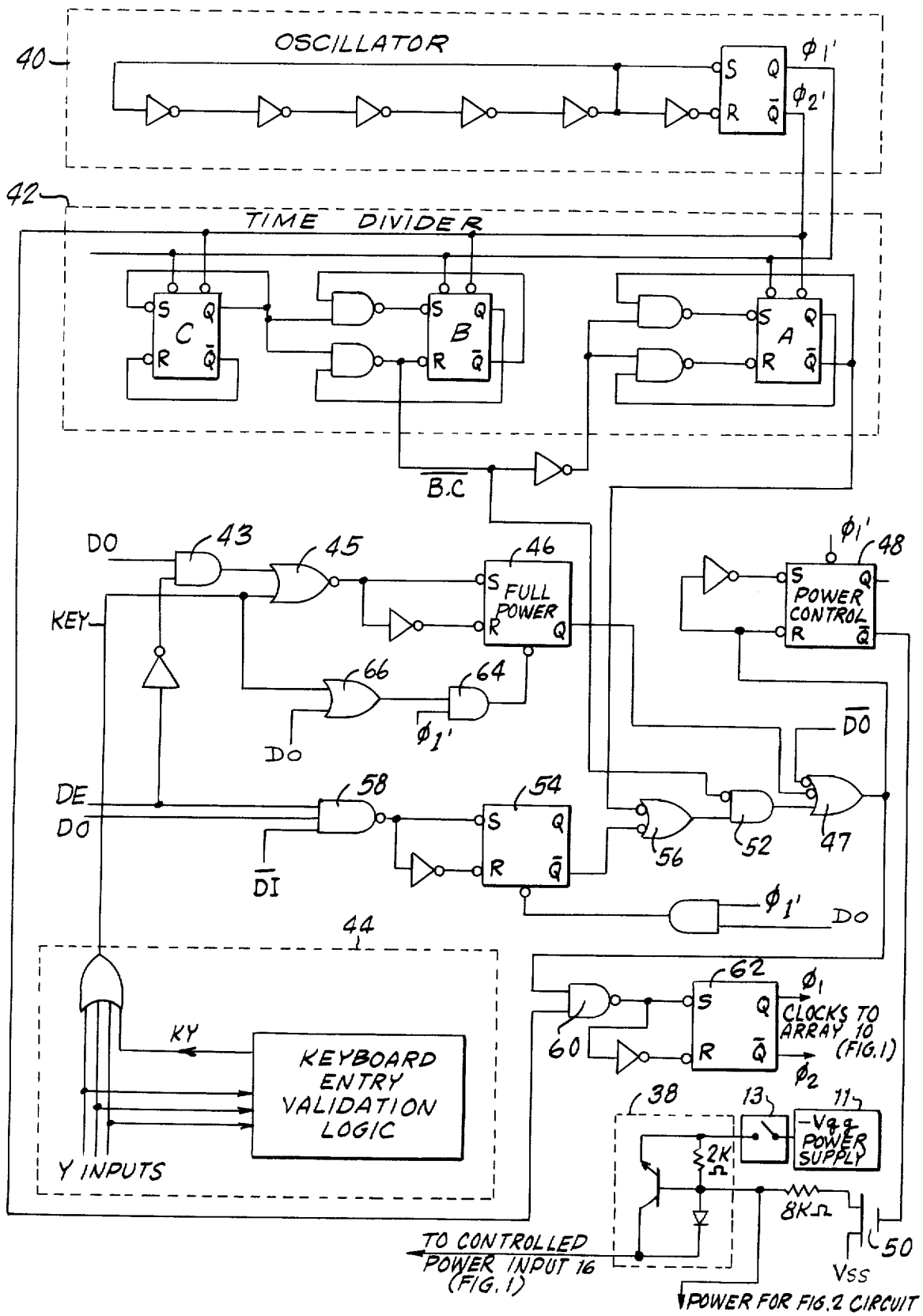

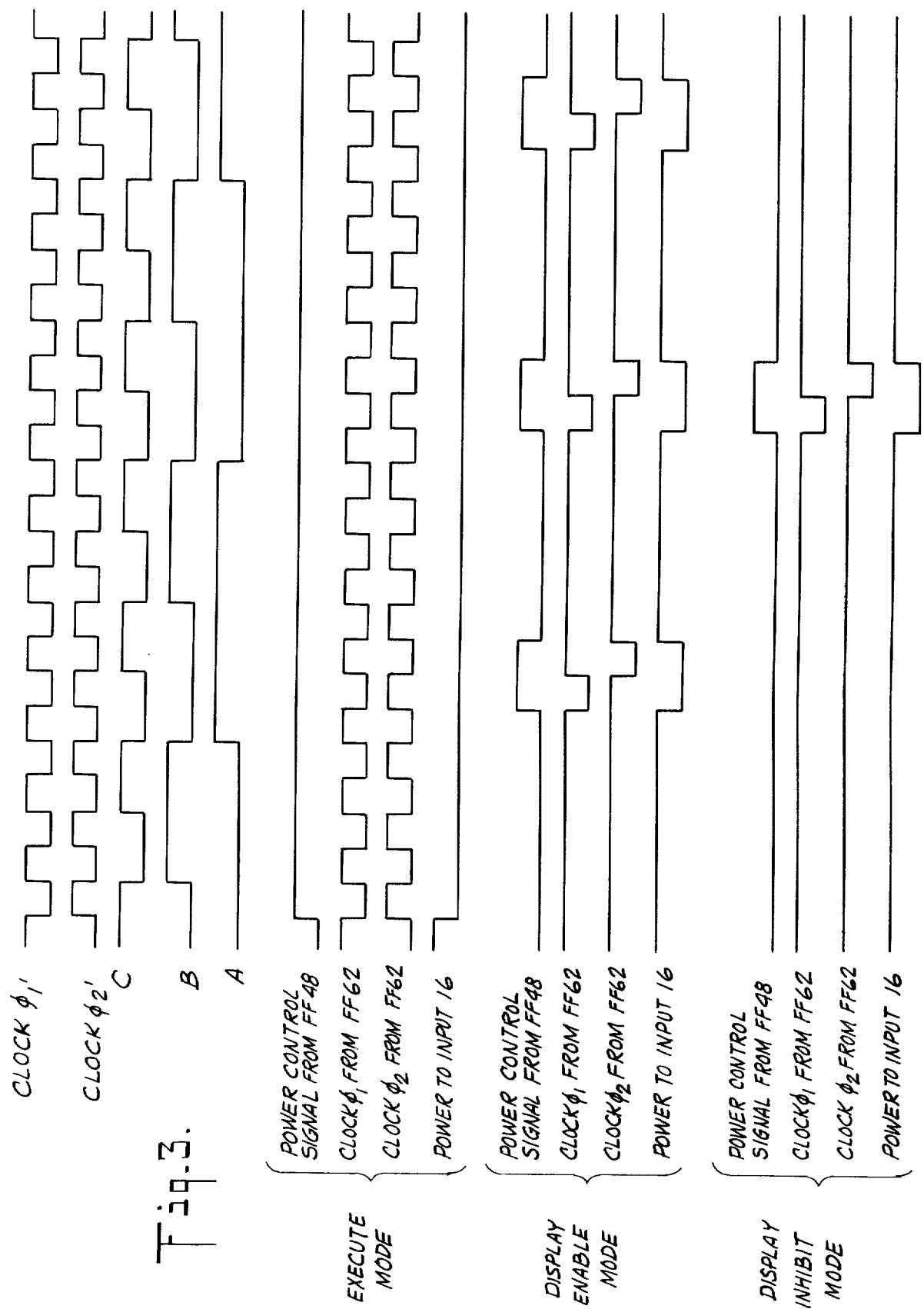

REDUCING POWER CONSUMPTION IN CALCULATORS

BACKGROUND OF THE INVENTION

The invention is in the field of calculators employing dynamic storage of information and dynamic display of stored information, and specifically relates to calculators of this type in which the rate of power consumption is of concern, such as in hand-held calculators which are battery powered.

Calculators of this type typically have three alternate operating modes. There is an execute mode during which input information is decoded and is arithmetically and logically processed in accordance with either input or stored commands to provide selected processed information. The execute mode operation is typically followed automatically, without operator intervention, by a display mode in which selected processed information is displayed. When selected new information is entered, there is a new execute mode operation followed by a new display mode operation. If there is no new execute mode operation within a certain time interval, the calculator automatically goes into a display inhibit mode (alternately called blanking), in which the relevant information is no longer displayed, but is maintained in storage so that it can be again displayed if needed.

A typical calculator of this type (disclosed in White et al. U.S. Pat. No. 3,781,852) operates at full power during all three modes of operation, the only power reducing scheme being that the display is not driven during the display inhibit mode of operation. A somewhat different approach is disclosed in Bogert et al. U.S. Pat. No. 3,453,601 where a calculator is clocked at a high frequency during its arithmetic mode operation to ensure high calculating speed but is clocked at a lower frequency and low duty cycle during its subsequent display mode operation in order to reduce power consumption. However, the Bogert et al. system has no display inhibit mode of operation and has no special provisions for applying power to the calculator at different duty cycles during different modes of operation.

SUMMARY OF THE INVENTION

An object of the invention is to reduce the power consumption of calculators, and particularly of hand-held calculators which are battery powered, by supplying to the calculator only as much power as actually needed for each different mode of operation and by clocking the calculator at a rate which is only as high as actually needed for each different mode of operation.

The invention is applicable to calculators which have three different modes of operation: an execute mode in which input information is decoded and is processed to derive and dynamically store selected processed information, a display enable mode in which selected stored information is maintained in dynamic storage and is concurrently dynamically displayed, and a display inhibit mode during which selected information is maintained in dynamic storage but is not displayed. Each execute mode operation is typically initiated by information keyed by an operator through a keyboard and includes decoding the keyed information, any calculations such as addition, multiplication, etc. and storing of any resulting information in dynamic storage. Once the execute mode operation is completed, the calculator automatically goes into a display enable mode, without operator intervention. In accordance with the invention, the power supplied to the calculator during each execute mode operation is at a high duty cycle (e.g., continuous power) and the calculator is continuously clocked with a high rate clock, so as to minimize the duration of the execute mode operation and quicky provide the information sought by the operator.

During the display enable mode operation which follows each execute mode operation, the decoding or calculations results are displayed dynamically. If certain new information is keyed in during the display enable mode operation, the calculator goes into a new execute mode operation, which is followed by a new display enable mode operation. If no such new information is keyed in for a certain period of time during the display enable mode operation, the calculator automatically goes into a display inhibit mode operation, without any operator intervention. In accordance with the invention, the duty cycle of the power supplied to the calculator during each display enable mode operation is lower than the duty cycle of the power supplied during the execute mode operation, e.g., the calculator is supplied with a chopped voltage at a one-fourth duty cycle. Further, the duty cycle of the clock pulses supplied during the display enable mode is lower than the duty cycle of the clock pulses supplied during the execute mode, e.g., the same width clock pulses are supplied during the display enable mode operation, but only while power is being supplied to the calculator.

When the calculator goes into a display inhibit mode operation, the display is blanked out, but it is still necessary to preserve certain dynamically stored information. In accordance with the invention, during each display inhibit mode operation the calculator is supplied with power at a duty cycle which is lower than that supplied during the display enable mode operation, e.g., with a chopped voltage at one-eighth of the duty cycle of the voltage supplied during the execute mode operation. Further, the duty cycle of the clock supplied to the calculator is lower than that supplied during the display enable mode, e.g. the same width clock pulses are supplied but only while power is being applied to the calculator.

Typically, a calculator of this type is in an execute mode for only a small fraction of its operating time, and most of the operating time is spent in the display enable mode. The display inhibit mode occurs rarely (for example, when the operator forgets to turn off the calculator) but when it occurs, and no provisions are made to reduce power consumption, it is likely to continue for a substantial period of time and to drain a substantial amount of battery power.

In accordance with the invention, both the power supply duty cycle and the clock duty cycle are controlled to reduce power consumption without sacrificing speed or accuracy, since both are optimized for each of the three different operating modes of the calculator. Further in accordance with the invention, both the calculator logic array and the necessary logic and circuit elements for carrying out this invention are parts of the same integrated circuit, to thereby improve the reliability of the calculator, and to reduce the cost of implementing the invention as compared to implementing the invention in a circuit composed of discrete components or in a separate integrated circuit.

BRIEF DESCRIPTION OF THE DRAWINGS

FIG. 2 is a detailed logic and circuit diagram illustrating an embodiment of the invention.

FIG. 3 is a timing diagram illustrating the duty cycle of the power and of the clock pulses supplied in accordance with the invention to a calculator during each of three different operating modes thereof.

DETAILED DESCRIPTION

Figure 1:
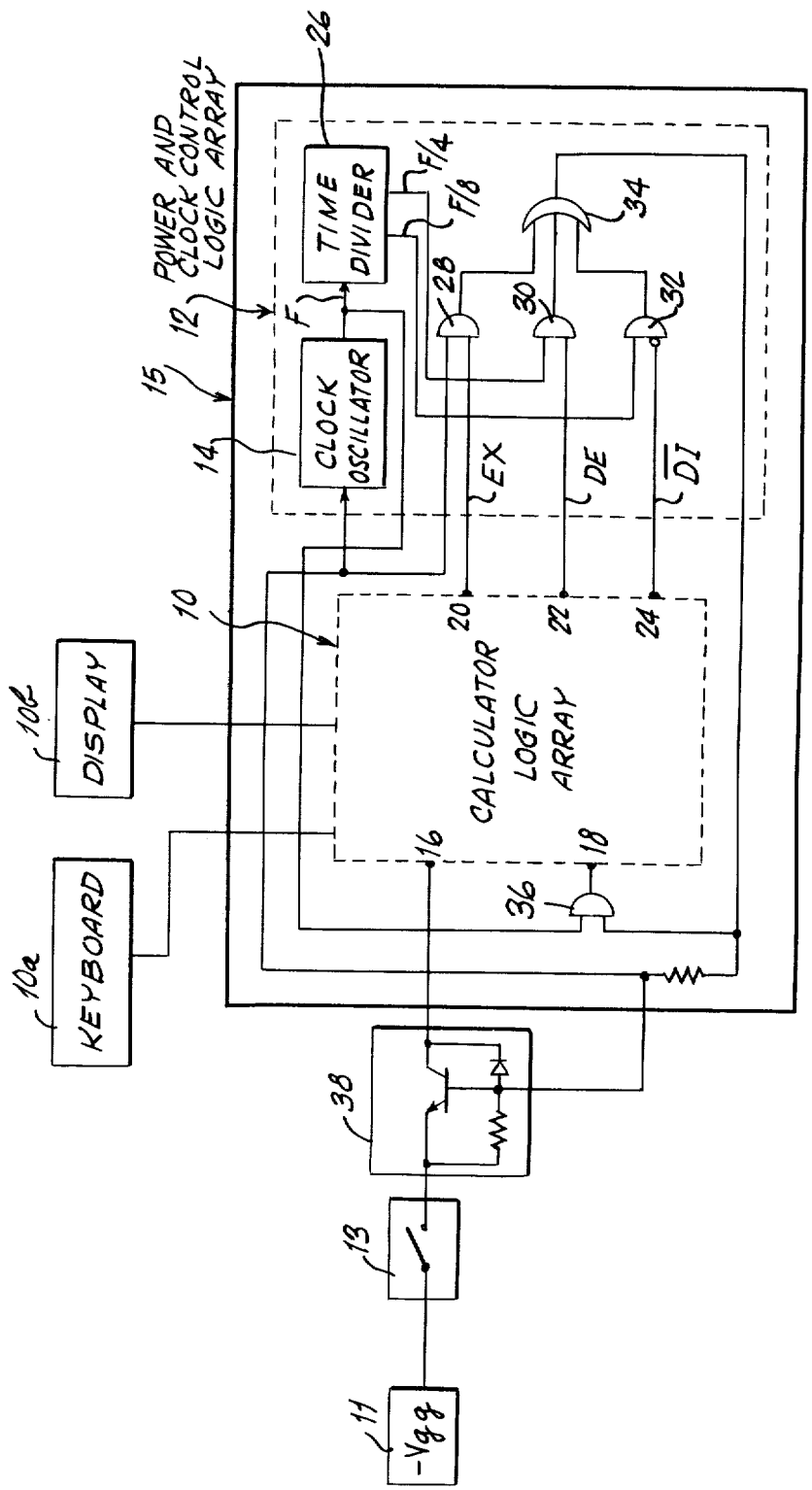
FIG. 1 is a simplified block and logic diagram of a calculator embodying the invention.

The invention is described as applied to a hand-held, battery powered calculator of the type disclosed in White et al. U.S. Pat. No. 3,781,852, which uses dynamic storage of the type described in the White et al. patent or in Bogert et al. U.S. Pat. No. 3,453,601 and a dynamic display of the type described in the White et al. patent. However, it should be clear that the invention is applicable to other calculators using dynamic storage and display in which the rate of power consumption is of concern and in which it is desirable to reduce power consumption.

Referring to FIG. 1, a calculator logic 10, a keyboard 10a and a display 10b are generally of the type shown in the White et al. patent, supra, or calculator logic 10 may be of the type manufactured by MOS Technology, Inc., under the name Calculator Array 2521. However, power and clock are not supplied directly to the power supply input 16 and the clock input 18 of calculator logic 10 as in the prior art, but are supplied under the control of a power and control logic 12 which forms a part of this invention and which, in accordance with the invention, is formed on the same IC chip 15 with calculator logic 10.

Calculator logic 10 provides at its output 20 a control signal EX while the calculator is operating in an execute mode, provides at its output 22 a control signal DE while the calculator is operating in a display enable mode and provides at its output 24 a control signal $\overline{DI}$ which is high when the calculator is either in the execute mode or in the display enable mode and is low otherwise. Since the control signals (or their equivalents) provided at the output 20, 22 and 24 of calculator 10 are provided by prior art calculators of the type described in the White et al. patent, supra and by the MOS Technology, Inc. Calculator Array 2521, and such calculators do not form a part of this invention, no detailed description is given of the circuits necessary to generate these control signals.

The operation of a calculator in accordance with the invention is described briefly and in a simplified form in connection with FIG. 1, and the detailed construction and operation of a calculator embodying the invention is described in connection with FIGS. 2 and 3.

Referring to FIG. 1, when an ON/OFF switch 13 is closed manually by an operator, power supply 11 is connected to turn on clock oscillator 14 and provide at the oscillator output a clock signal at a frequency F. This clock signal is applied to a time divider 26 which outputs clock signals at one-fourth and at one-eighth the frequency F of oscillator 14. Assuming that the ON/OFF switch 13 has just been closed but no information has yet been entered through keyboard 10a, each of the control signals EX, DE and $\overline{DI}$ is low. As a result, AND-gates 28 and 30 remain disabled, but AND-gate 32 is intermittently enabled at a rate corresponding to one-eighth the frequency F of oscillator 14. The intermittent output of AND-gate 32 is applied through an OR-gate 34 to enable AND-gate 36 and turn on transistor switch 38 intermittently, at the same duty cycle, to thereby intermittently apply power to the power supply input 16 and to apply clock pulses to the clock input 18 of calculator array 10 at a duty cycle corresponding to one-eighth the frequency F of oscillator 14.

When an execute mode operation starts, e.g. in response to information keyed in by an operator through keyboard 10, the control signal $\overline{DI}$ goes high, thereby disabling AND-gate 32, but control signal EX also goes high, thereby enabling AND-gate 28 to apply a continuous high output to AND-gate 36 and switch 38 through OR-gate 34, thereby applying continuous power to the power supply input 16 of calculator array 10 and applying clock pulses to the calculator array clock input 18 at the frequency F of oscillator 14. Meanwhile, the control signal DE remains low and gate 30 remains disabled.

When the execute mode operation ends, control signal DE goes high, while control signal EX goes low and control signal $\overline{DI}$ remains high. Therefore, AND-gate 28 is disabled and AND-gate 32 remains disabled, but AND-gate 30 is enabled intermittently at a duty cycle corresponding to one-fourth the frequency F of oscillator 14, to thereby enable AND-gate 36 and turn on switch 38 intermittently. Therefore, power is applied to the calculator power supply input 16 and clock pulses are applied to the clock input 18 of the calculator 10 intermittently, at a rate corresponding to one-fourth the duty cycle of the frequency F of oscillator 14.

If a new execute mode operation occurs while the control signal DE is high, control signal EX goes high, while control signal DE goes low and control signal $\overline{DI}$ remains high, and the power and clock applied to calculator array 10 are at a high duty cycle. If no new execute mode operation occurs within a certain time interval after control signal DE goes high, control signals $\overline{DI}$ and DE go low, while control signal EX remains low, and the lowest duty cycle power and clock are applied to calculator array 10.

As a result, full power and a high duty cycle clock are applied to calculator 10 during an execute mode operation, to thereby minimize the time needed to do the necessary processing of input information, but the duty cycle of both the power applied to calculator 10 and the clock with which the calculator 10 is clocked are lowered during the display enable mode of operation, where great processing speed is not of the essence and the need is only to clock the calculator at a sufficient speed and with sufficient power so as to preserve certain dynamically stored information and to clock display 10b with sufficient power and speed to prevent visible flicker and maintain sufficient brightness. Furthermore, if the calculator enters into a display inhibit mode of operation, the duty cycle of the power supplied to it and the duty cycle of the clock with which it is clocked are further reduced, since brightness and visible flicker are no longer of concern, nor is speed of arithmetic and logic operations, the only concern being the preservation of certain dynamically stored information.

For simplicity, the description of FIG. 1 does not take into account the fact that immediately upon the closing of switch 13, calculator array 10 goes into a "power on clear" routine, which is an execute mode operation and typically lasts for a small fraction of a second, and then goes into a display enable mode operation, displaying at display 10b a selected symbol such as a 0 and thereafter goes into a display inhibit mode if no new execute mode has been initiated by an operator through keyboard 10a. Also for the sake of simplicity, clock oscillator 14 is shown as providing a clock signal at a frequency F, while in fact, as discussed in connection with FIGS. 2 and 3, there are two complementary clock pulse trains. With respect to the terms "high" and "low" as applied to the control signals EX, DE and DI, it should be clear that the reference is to logical levels and not to voltage levels of signals. Further, it should be clear that the duty cycle of the power applied to calculator array 10 can be other than as described above, e.g., full power or high duty cycle power during an execute mode, one-third duty cycle during a display enable mode, one-sixth duty cycle during a display inhibit mode, etc., and it should be clear that the term "high duty cycle power" may mean less than 100% duty cycle.

Referring to FIG. 2, which shows in greater detail an embodiment of the invention whose principles were described in simplified form in connection with FIG. 1, a clock generator 40 corresponds to oscillator 14 of FIG. 1, but provides clock signals $\phi_1'$ and $\phi_2'$ rather than a single signal F. Clock oscillator 40 comprises a conventional configuration of a flip-flop whose set and reset inputs are interconnected as shown by a series of inverters, and the two clock signals provided at the outputs of the flip-flops are at the ame frequency but 180° out of phase. The clock signals $\phi_1'$ and $\phi_2'$ are applied to a time divider 42 to clock each of its flip-flops labelled A, B and C, which are interconnected in a conventional time-divider configuration through suitable gating.

Referring to FIG. 3, where the top two lines show the clock signals $\phi_1'$ and $\phi_2'$ in idealized form, the next three lines from top to bottom show the signals at the Q outputs of the correspondingly labelled flip-flops of time divider 42. As shown in FIG. 3, the output of flip-flop C is at one-half the frequency of the clock signals, the output of flip-flop B as at one-quarter the frequency of the clock signals and the output of flip-flop A is at one-eighth the frequency of the clock signals from clock oscillator 40.

An execute mode operation starts unconditionally upon the receipt of a key validation signal KEY from a circuit 44 (which is described in detail in Arnold and McLaughlin U.S. Pat. No. 3,792,466). At this time control signals DE and DI are low. A key validation signal KEY from circuit 44 sets a Full Power flip-flop 46 through a gate 45, and the resulting output of flip-flop 46 sets a Power Control flip-flop 48 through a gate 47. The resulting output of flip-flop 48 turns on switch 38 through a switch 50, to thereby apply controlled power (at this time continuously) to the controlled power input 16 of calculator array 10 (FIG. 1).

At the end of an execute mode operation and the beginning of a display enable mode operation, control signal DE goes high, control signal KEY is low, and control signal DI remains low. Full Power flip-flop 46 is therefore reset, and can no longer set Power Control flip-flop 48. However, Power Control flip-flop 48 can now be set through gate 47 from the output of gate 52, which receives two inputs — one is the AND function of the signals B and C from time divider 42, and the other is either the complement of the signal A from time divider 42 or the complementary output of a flip-flop 54, as provided at the output of a gate 56. Flip-flop 54 is set by the output of a gate 58 when control signal DE is high but control signal DI is low (for the time being, the nature and function of a control signal DO are disregarded). When flip-flop 54 is set, the logical low signal at its complementary output is applied through gate 56 to gate 52, so that the signal applied to Power Control flip-flop 48 through gates 52 and 47 is the logical AND function of time divided signals B and C. As a result, power control flip-flop 48 is set and reset in timed relation to that AND function, as illustrated in FIG. 3. There is a time delay equal to one-half the cycle of the clocks $\phi_1'$ and $\phi_2'$ because of the way the relevant flip-flops are clocked, as explained later.

At the end of a display enable mode of operation and the beginning of a display inhibit mode of operation, control signal DE goes low and control signal DI goes high. As a result, flip-flop 54 is reset by the output of gate 58, and the logical high at the complementary output of flip-flop 54 no longer provides a logical high signal at the output of gate 56. Now gate 52 is enabled only at the coincidence of time divided signals A, B, and C, and Power Control flip-flop 48 is enabled and disabled in time relationship to this logical AND function of the time divided signals A, B, and C. Again, note that the power provided at the output of circuit 50 is delayed with respect to the AND function of control signals A, B, and C by one-half the cycle of the clock signals $\phi_1'$ and $\phi_2'$.

Referring to FIG. 3, the power applied to the controlled power input 16 of calculator array 10 from circuit 38 during an execute mode operation is continuous power, the power applied during a display enable mode operation is intermittent power, at 25% duty cycle, and the power applied during the display inhibit mode of operation is intermittent power, at a 12½% duty cycle. Of course, other suitable duty cycles may be chosen in practicing this invention.

In order to control the duty cycle of the clock applied to clock input 18 of calculator 10 so as to maintain synchronization between the power on and off cycles of calculator array 10 and the clock applied to its input 18, the output of gate 47 is combined with the clock $\phi_2'$ at a gate 60, and the output of gate 60 sets and resets a flip-flop 62 whose two outputs provide the two complementary clocks $\phi_1$ and $\phi_2$ for the controlled clock input 18 of calculator array 10. As a result, flip-flop 62 is set and reset at the frequency of clock $\phi_2'$ only while power is being applied to the controlled power input 16 of calculator 10 from circuit 38.

Referring to FIG. 3, the clock signals $\phi_1$ and $\phi_2$ from the output of flip-flop 62 are applied to the clock input 18 of calculator 10 at the frequency of clocks $\phi_1'$ and $\phi_2'$, concurrently with the continuous power applied to the power supply input 16 of calculator 10 during an execute mode operation. However, during a display enable mode operation, only one clock pulse $\phi_1$ and one clock pulse $\phi_2$ are applied to calculator array 10 each time power is applied thereto, i.e. during a display enable mode operation calculator array 10 is clocked at one-fourth the frequency at which it is clocked during an execute mode operation. During a display inhibit mode operation, again a single clock pulse $\phi_1$ and a single clock pulse $\phi_2$ are applied to the clock input 18 of calculator array 10 each time power is applied to the power supply input 16 thereof, i.e. the frequency at which calculator array 10 is clocked during a display inhibit mode operation is one-eighth the frequency at which it is clocked during an execute mode operation.

For simplicity, the control signal DO was not discussed in the above description of FIG. 2. This control signal is high periodically during operation of the calculator in either of its three modes to provide for periodic accessing of a dynamic readonly memory which forms a part of calculator array 10 and is used as a program ROM. Thus, when the control signal DO is high, the program ROM and the associated control logic for the next instruction are being set up in calculator array 10, but all other memories forming a part of array 10 are inhibited. The control signal DO, or its equivalent, is generated in prior art calculator arrays, e.g., the MOS Technology, Inc. Calculator Array 2521, and the circuits for its generation need not be discussed here. In the referenced calculator array, the period of the clocks $\phi_1$ and $\phi_2$ is about 6 microseconds, and the DO signal is high for about 36 microseconds once every approximately 330 microseconds. It should be clear that different time intervals can be chosen, and it should be clear that where a static program ROM is used in different calculator arrays, there would be no need for a control signal corresponding to DO.

Referring to FIG. 2, when the control signal DO goes high, Power Control flip-flop 48 is set through gate 47, to apply full power to calculator array 10, and gate 60 is enabled to continuously apply clocks $\phi_1$ and $\phi_2$ to calculator array 10. Furthermore, the setting and resetting of flip-flops 46 and 54 is related to the same control signal DO. Thus, the AND function of control signal DO and the complement of control signal DE as provided by a gate 43, is applied to the inputs of Full Power flip-flop 46 through gate 45 as shown in FIG. 2, and flip-flop 46 is clocked with the NAND function of the clock $\phi_1'$ and either the control signal KEY or the control signal DO, as provided by gates 64 and 66. Furthermore, the set and reset inputs of flip-flop 54 are controlled by gate 58 which provides the AND function of control signals DO, DE and the negation of control signal DI, and flip-flop 54 is clocked with the NAND function of clock signal $\phi_1'$ and the control signal DO. However, as discussed above, the invention is equally applicable to a calculator array which has a static program ROM and does not need a control signal of the type of control signal DO.

In summary, the rate of power consumption of calculators embodying the invention is substantially reduced because only as much power is supplied to the calculator as needed for each of the several different modes of operation. Specifically, high duty cycle power is applied during an execute mode, when speed of operation is of the essence, intermediate duty cycle power is applied during a display mode, when maintaining dynamically stored information and preventing visible flicker of the display are of primary concern, and lower yet duty cycle power is applied during a display inhibit mode, when the only primary concern is the maintenance of certain dynamically stored information. Any suitable duty cycles can be chosen for each of the three different operating modes, for example 100%, 25%, and 12½% duty cycles, or any other suitable combination of duty cycles. The high duty cycle need not be continuous power. Further in accordance with the invention, the clocking of the calculator is maintained synchronous with the power duty cycles applied thereto. Still further in accordance with the invention, both the calculator array and the power and clock control array are parts of the same integrated circuit, to ensure reliability and to lower the cost of implementing the invention.

We claim:

1. A method of reducing the power consumption rate of a calculator alternately operative in an execute mode in which new input information is processed in accordance with selected commands and is dynamically stored in the calculator, in a display mode in which selected stored information is dynamically displayed, and in a display inhibit mode in which selected stored information is maintained in dynamic storage but is not displayed, a display mode operation following an execute mode operation and continuing either until a new execute mode operation or the elapsing of a selected time interval from its start, whichever occurs first, and a display inhibit mode operation occurring in the absence of an execute or a display mode operation, comprising the steps of: supplying the calculator with high duty cycle power concurrently with the operation thereof in the execute mode; supplying the calculator with an intermediate duty cycle power concurrently with the operation thereof in the display mode; and supplying the calculator with a low duty cycle power concurrently with the operation thereof in the display inhibit mode.

2. A method as in claim 1 including the steps of: clocking the calculator at a high duty cycle clock rate during the operation thereof in the execute mode; clocking the calculator at an intermediate duty cycle clock rate during the operation thereof in the display mode; and clocking the calculator at a low duty cycle clock rate during the operation thereof in the display inhibit mode.

3. A method as in claim 2 wherein the calculator is clocked with clock pulses which have substantially the same width for each of the operative modes of the calculator but which occur only while power is being supplied to the calculator during each of its different operative modes.

4. A method as in claim 1 wherein the calculator is supplied with power at substantially 100% duty cycle during the operation thereof in the execute mode, 25% duty cycle during the operation thereof in the display mode and 12½% duty cycle during the operation thereof in the display inhibit mode.

5. A calculator alternately operative in an execute mode in which input information is processed in accordance with selected commands and is dynamically stored in the calculator, in a display mode in which selected stored information is dynamically displayed, and in a display inhibit mode in which selected stored information is maintained in dynamic storage but is not displayed, a display mode operation following an execute mode operation and continuing either until a new execute mode operation or the elapsing of a selected time interval from its start, whichever occurs first, and a display inhibit mode operation occurring in the absence of an execute or a display mode operation, said calculator having a power supply input and including: means for applying high duty cycle power to the power supply input of the calculator concurrently with the operation thereof in the execute mode, means for applying to the power supply input of the calculator intermediate duty cycle power concurrently with the operation thereof in the display mode, and means for applying to the power supply input of the calculator low duty cycle power concurrently with the operation thereof in the display inhibit mode.

6. A calculator as in claim 5 including means for clocking the calculator at a high duty cycle clock rate during the operation thereof in the execute mode, means for clocking the calculator at an intermediate cycle clock rate during the operation thereof in the display mode and means for clocking the calculator at a low duty cycle clock rate during the operation thereof in the display inhibit mode.

7. A calculator as in claim 6 wherein the clocking means apply to the calculator clock pulses whose width is the same for each of the operative modes of the calculator but which occur only while power is being applied to the power supply input during each of the different operative modes of the calculator.

8. A calculator as in claim 5 wherein the duty cycles of the power during the execute, display and display inhibit modes are substantially 100%, 25%, and 12½% respectively.

9. A calculator as in claim 5 wherein at least a major portion of the means for applying power to the power supply input of the calculator are formed as a part of the same integrated circuit as at least a major portion of the means for processing and storing.

10. A method of reducing the power consumption rate of a calculator selectively and alternately operative in one of three different modes, comprising the steps of: supplying the calculator with high duty cycle power concurrently with the operation thereof in a first operative mode, supplying the calculator with intermediate duty cycle power concurrently with the operation thereof in a second operative mode and supplying the calculator with low duty cycle power concurrently with the operation thereof in a third operative mode.

11. A calculator having calculating and display means alternately operative in one of three different modes, comprising: means for supplying the calculator with high duty cycle power concurrently with the operation thereof in a first operative mode, means for supplying the calculator with intermediate duty cycle power concurrently with the operation thereof in a second operative mode, and means for supplying the calculator with low duty cycle power concurrently with the operation thereof in a third operative mode.

12. A method of operating a calculator having an execute mode in which input information is processed in accordance with selected commands and is dynamically stored in the calculator, a display mode in which selected stored information is dynamically displayed and a display inhibit mode in which selected stored information is maintained in dynamic storage but is not displayed, a display mode operation following an execute mode operation and continuing either until a new execute mode operation or the elapsing of a selected time interval from its start, whichever occurs first, and a display inhibit mode operation occurring in the absence of an execute or a display mode operation, comprising the steps of clocking the calculator at a high duty cycle clock rate during the operation thereof in the execute mode, clocking the calculator at an intermediate duty cycle clock rate during the operation thereof in the display mode, and clocking the calculator at a low duty cycle clock rate during the operation thereof in the display inhibit mode.

13. A method as in claim 12 wherein the calculator is clocked with clock pulses which have substantially the same width for each of the operative modes of the calculator, but which occur at different intervals for the different operative modes.

14. A method as in claim 12 including the steps of supplying the calculator with power whose duty cycle is different for each of the different operative modes of the calculator.

15. A method as in claim 14 wherein the power supplied to the calculator during the execute mode operation has a high duty cycle, the power supplied during the display mode operation has an intermediate duty cycle and the power supplied during the display inhibit mode has low duty cycle.

* * * * *